United States Patent Office 3,721,391
Patented Mar. 20, 1973

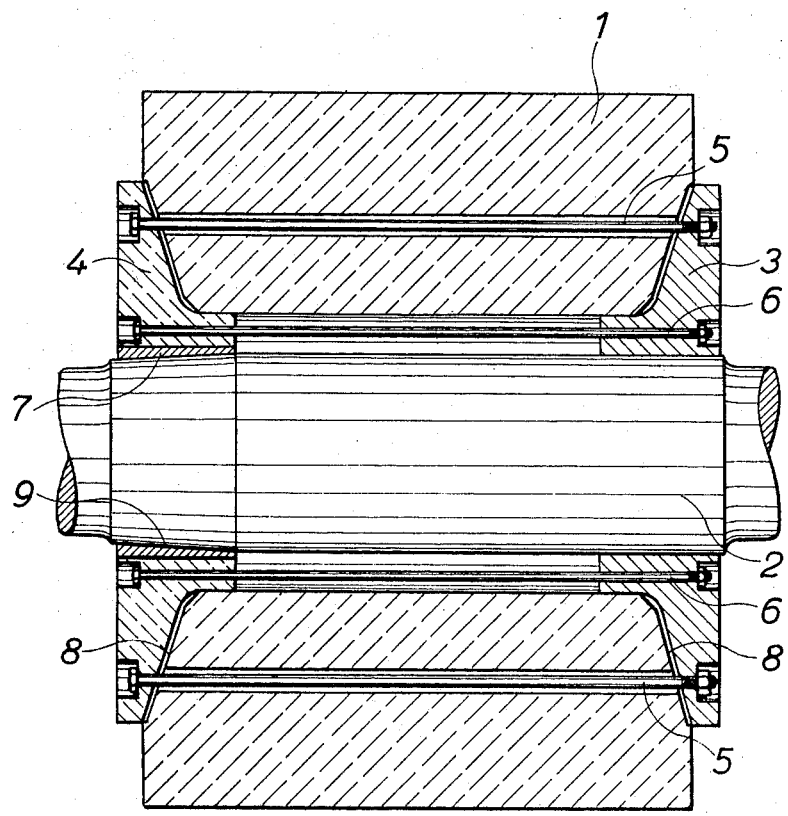

3,721,391
ARRANGEMENT FOR FIXING THE GRINDING
STONE IN A PUMP GRINDER
Aimo Emil Lepola, Kaipola, Finland, assignor to
Yhtyneet Paperitehtaat Osakeyhtio, Kaipola, Finland
Filed Sept. 4, 1970, Ser. No. 69,712
Claims priority, application Finland, Aug. 12, 1970,
2,211/70
Int. Cl. B02c 13/26; B24d 5/16
U.S. Cl. 241—293                                    2 Claims

ABSTRACT OF THE DISCLOSURE

This invention relates to an improvement in an arrangement for fixing a wood-grinding stone on a shaft with the aid of two flanges pressing against it. According to the invention one of the two flanges is mounted on the shaft with shrink fit and the other flange, with force fit accomplished by driving the flange, provided with a tapering bore, upon the tapering shaft.

The present invention discloses a new solution for the problem of fixing a wood-grinding stone upon the shaft that imparts rotatory motion to it. As a consequence of the large size and high price of the stones which are used in the manufacturing of mechanical wool pulp, it is necessary that exchange of stones is an easy and rapid process, and special requirements are imposed on the fixing of the stone as regards safety and strength. The commonly employed solution is that the stone has been clamped between two flanges mounted on the shaft with right-hand and left-hand threads, respectively. As a result, the moment opposing rotation of the stone will draw the flanges tight against the stone. As a consequence of this self-tightening feature, the press force may increase excessively. Furthermore, this causes extra tension on the shaft, which is also weakened by the thread grooves.

According to the present invention the above drawbacks are eliminated, and the invention is characterized in that one of the two flanges is mounted on the shaft by shrinkage joint and the other, by pressure joint, this latter being achieved by forcing the flange, provided with a conical bore, onto the conical shaft. Thus, no notches are required on the shaft which would detract from its strength, and the shaft can be made smaller in diameter without detriment to its strength. Furthermore, the joint is easy to accomplish or to dismount and requires no special tools.

Since thus both flanges are rigidly mounted on the shaft, it is necessary for accomplishing the requisite pressure force against the stone that the point of action of this force be near the outer periphery of the flange. Therefore, an advantageous design according to the invention is characterized in that the requisite compression against the stone is accomplished with the aid of bolts connecting the flanges to their outer periphery and passing through the stone. The flanges will then readily display elastic action in the minimal amount required for tightening. By means of this design, uniform pressure is achieved close to the outer periphery of the stone, whereby the joint will be strong and durable. The joint is made particularly uniform and independent of temperature differences by the fact that the tension bolts have comparatively small mass and that they are located inside the stone, whereby they also rapidly follow the temperature of the stone. The long distance between the shaft and the point of fixing of the stone, again, reduces the significance of the temperature difference between shaft and stone.

In the following one design according to the invention has been presented with the aid of a figure. In this, 1 is the grinding stone and 2 is the shaft imparting rotation to it. On the shaft two flanges 3 and 4 have been mounted. These flanges are connected by bolts 5 used for applying pressure against the stone and by bolts 6 used for forcing one of the flanges onto the shaft. Furthermore, there has been attached to the flange 4 a sleeve 7 of appropriate material in view of the driving-on operation, and the gap 8 between the flanges and the stone has been grouted with concrete or sulphur.

Attachment of the wood-grinding stone to the shaft takes place as follows according to the present invention. The flange 3 is warmed up and placed in position on the shaft, where it cools and shrinks to appropriate fit. The stone is then placed on the shaft so that a small gap 8 remains between it and the flange 3, whereupon the flange 4 is forced upon the taper 9 on the shaft by tightening the bolts 6 and by using pressure oil, in a manner belonging to prior art. After the flange has been forced up to appropriate fit, there remains a small amount of play also between this flange and the stone. The bolts 5 are inserted and the gaps between the flanges and the stone are grouted with concrete or sulphur. After this filling has set, the bolts 5, of which there are several, are tightened up to their final tightness.

I claim:

1. In an arrangement for fixing a wood-grinding stone upon a shaft having a cylindrical portion and a tapered portion, first and second flanges encompassing said shaft, said flanges being positioned respectively one on each side of said stone and pressing thereagainst, the improvement comprising; the first one of said flanges being shrink-fitted onto the cylindrical portion of said shaft, said other flange being positioned about the tapered portion of said shaft, and a tapering bore between said second flange and said shaft, said second flange being axially driveable along said tapering bore toward said first flange so as to engage said shaft in a force-fitting relationship, bolt means interconnecting said first and second flanges adjacent their radially outer periphery and extending axially through said stone, said bolt means being tightened so as to effect a predetermined pressure against the side of said stone by said flanges, and further bolt means interconnecting said first and second flanges adjacent their radially inner portions in proximity to said shaft and being axially coextensive therewith, said further bolt means being tightened so as to impart axial movement to said second flange for engaging the shaft in said force-fitting relationship.

2. An arrangement as claimed in claim 1, said tapering bore comprising a sleeve member having a tapered bore conforming to the tapered portion of said shaft.

References Cited

UNITED STATES PATENTS 3,138,338    6/1964    McKenna _____ 241—294
3,465,425    9/1969    Leidenfrost _____ 29—445 X
3,620,462    11/1971   Dooley _____ 241—294

FOREIGN PATENTS 996,768    6/1965    Great Britain _____ 241—300

ROBERT C. RIORDON, Primary Examiner
E. F. DESMOND, Assistant Examiner

U.S. Cl. X.R.

51—206 R; 287—52.01